No. 852,058. PATENTED APR. 30, 1907.
A. W. FRENCH.
STEAM COOKER FOR OIL BEARING MEAL AND THE LIKE.
APPLICATION FILED JUNE 10, 1905.
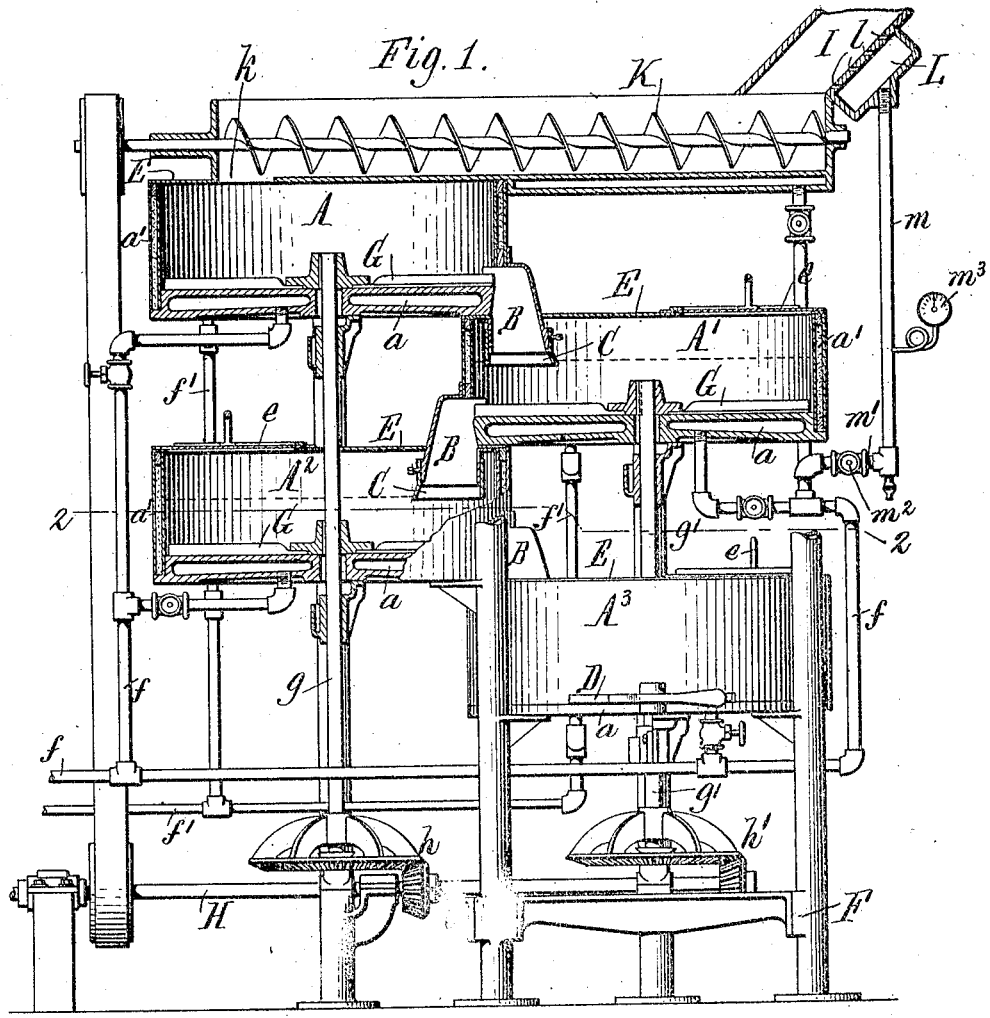
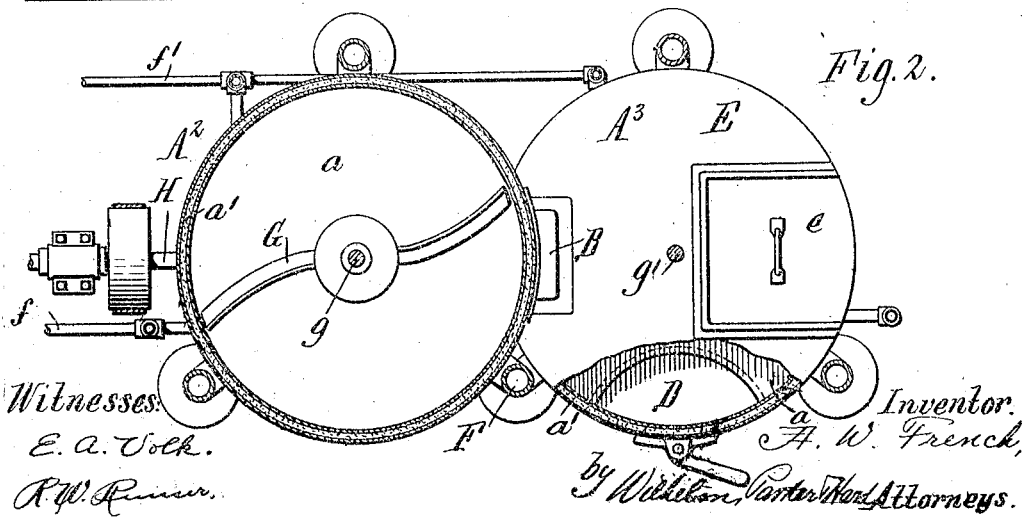

UNITED STATES PATENT OFFICE.

ALFRED W. FRENCH, OF PIQUA, OHIO.

STEAM-COOKER FOR OIL-BEARING MEAL AND THE LIKE.

No. 852,053.        Specification of Letters Patent.        Patented April 30, 1907.

Application filed June 10, 1905. Serial No. 264,664.

*To all whom it may concern:*

Be it known that I, ALFRED W. FRENCH, a citizen of the United States, residing at Piqua, in the county of Miami and State of Ohio, have invented a new and useful Improvement in Steam-Cookers for Oil-Bearing Meal and the Like, of which the following is a specification.

This invention relates more particularly to steam cookers or kettles of the kind employed in oil mills for cooking or heating the oil-bearing meal preparatory to expressing the oil therefrom.

These cookers usually comprise a series of steam jacketed kettles or vessels in which the meal is cooked, and the meal is drawn from the last kettle into the cake former or device for molding the meal into cakes suitable for insertion into the oil press. As ordinarily operated the meal is partially cooked in one kettle and then discharged into the next kettle of the series where the cooking is continued, this operation being repeated until the meal reaches the last kettle in which the cooking is completed. The discharge of the meal from one kettle to the next is not automatic and must be performed manually by an operative who must be a skilled meal cook if proper results are to be secured.

One object of the invention is to produce a steam cooker which will insure uniformity of cooking and an improved quality of meal, and reduce the labor in the cooking operation by automatically controlling the discharge of the meal from one kettle to the next so as to maintain the quantity of meal in each vessel except the first practically constant, and to regulate the length of time the meal remains in each kettle.

Other objects of the invention are to economize space by a novel arrangement of the kettles, and to provide means of simple construction for moistening the meal and which can be readily controlled to properly regulate the moisture of the meal.

In the accompanying drawings: Figure 1 is a sectional elevation of a steam cooking apparatus embodying the invention. Fig. 2 is a horizontal sectional plan in line 2—2, Fig. 1, partly broken away.

Like letters of reference refer to like parts in both figures.

A A' A² A³ represent steam cooking kettles, vessels, or chambers, which are arranged in a descending series, or one below the other, so that the meal can be discharged by gravity from one vessel into the next vessel below. The vessels or chambers are similar and, in the construction shown, each has the usual hollow bottom *a* forming a steam chamber and jacketed walls *a'* filled with some suitable non-conducting material.

Each vessel, except the bottom one, has a meal discharge spout B leading from its lower portion or bottom, preferably at one side thereof, and depending into the next vessel below. The mouths of the discharge spouts are open and the meal will discharge by gravity from one vessel through its discharge spout into the next vessel below until the meal rises in the lower vessel up to, or slightly above, the mouth of the discharge spout, when the flow of the meal will cease. Therefore by having all of the spouts terminate at the same distance from the bottoms of the vessels into which they depend, the meal cannot rise higher in one vessel than in another.

In order to regulate the depth of the meal in the vessels each discharge spout B is preferably provided with a telescoping section C, by raising and lowering which the elevation of the mouth of the spout can be changed and consequently the level of the meal in the vessel which it supplies can be regulated. The meal is fed into the first or top vessel, and is withdrawn from the last vessel into the cake former through the usual discharge gate D in the bottom of the last vessel.

The vessels may be closed, as shown, by tops E provided with suitable doors or gates *e* which can be opened to allow the escape of moisture when the meal is wet.

In the construction shown, the vessels are arranged in staggered order. This arrangement is desirable as it enables the bottom of one vessel to be located at the level of the top of the next vessel below, and the cooker occupies less vertical space than it would with the vessels arranged one directly over the other, if the necessary space between the vessels be allowed for the escape of moisture therefrom. The vessels are supported in this staggered relation on a frame or rack F of any suitable construction.

Steam is supplied to the steam chambers of the vessels and the water of condensation is drained therefrom by pipes *f f'* arranged in any usual or suitable manner. Each vessel is also provided with the usual rotary stirrer G or device of any sort for agitating the meal and moving it toward the discharge spouts B and gate D so that it will readily discharge therethrough. As shown, the stirrers are secured to two vertical shafts $g$ $g'$ which pass down through the bottoms of the vessels and are driven from a horizontal drive shaft H by bevel-gearing $h$ $h'$.

The invention relates to the means for automatically controlling the quantity of meal in the vessels, and is not dependent upon the construction of the vessels and stirring mechanism and the arrangement of the steam piping described, and these may be of any other suitable construction and arrangement.

In operation when the discharge gate D of the last vessel $A^3$ is opened and meal discharged into the cake former the level of the meal in the last vessel will fall sufficiently relative to the discharge spout B of the next vessel $A^2$ above, to allow the discharge of a corresponding amount of meal from the latter vessel, thus lowering the level of the meal in this vessel $A^2$ and thereby permitting a corresponding discharge from the next higher vessel $A'$. Each vessel thus discharges automatically into the vessel next below a quantity of meal substantially equal to that withdrawn from the last vessel, and the quantity of meal in each of the vessels except the first is maintained practically constant. On account of the stirrers the level of the meal in each vessel will be somewhat above the discharge opening of the spout which supplies it, but will remain practically uniform. As meal is discharged from the bottom of each vessel into the top of the vessel next below each time meal is withdrawn from the bottom vessel, the meal is kept in motion and only remains at the bottom of each vessel for a short period of time. All of the meal is thus uniformly cooked and none of it is overcooked, as is liable to be the case when the discharge of the meal from one vessel to the next is dependent upon an operative.

The cooker is automatic in its action and the services of a skilled meal cook are unnecessary.

The cooker is also preferably provided with means for moistening the meal and preliminarily heating it before entering the first vessel. These means may vary in construction and arrangement. As shown in the drawings, the meal is spouted through an inclined chute I into the steam jacketed trough of a screw conveyer K which discharges through a suitable opening $k$ into the first vessel. The ample heating surface of this feed conveyer raises the temperature of the meal to such a degree that the cooking is started at once in the first vessel.

The moistening device shown consists of a steam box L arranged in the bottom of the feed spout or chute and having an inclined top or plate over which the meal passes and which has perforations $l$ through which the steam is discharged into the meal. These perforations are preferably inclined relative to the plane of the top of the steam box to prevent the meal from falling into and clogging them.

The box is supplied with steam by pipes $m$ $m'$ which are of sufficient size, as compared with the combined area of the discharge perforations $l$, to maintain a steady pressure in the steam box. A steam controlling valve $m^2$ is provided in an accessible position and between this valve $m^2$ and the discharge perforations of the steam box is located a steam gage $m^3$. The perforations $l$ of the steam box will discharge a definite volume of steam at a certain pressure, and it is therefore possible to discharge a definite quantity of steam and thus exactly regulate the moisture of the meal.

The perforations $l$ of the steam box will discharge a definite volume of steam at a certain pressure, and it is therefore possible to give the meal a definite amount of steam and thus regulate its moisture, as desired, by merely opening the valve $m^2$ until the steam gage indicated a predetermined pressure.

The moistening device can be variously constructed and located elsewhere in the cooking system.

I claim as my invention.

1. The combination of a plurality of heating vessels or chambers for solid material arranged in a descending series and having openings at the bottom thereof for discharging the material, the discharge opening for each vessel except the last being arranged to discharge into a lower vessel and located below the top of such lower vessel in position to be stopped by the material rising in said lower vessel, and agitating means for causing the discharge of the material from the vessels, whereby material will automatically discharge from each vessel except the last into a lower vessel when material is withdrawn from the last vessel and the quantity of material in each vessel except the first will be maintained substantially constant, substantially as set forth.

2. The combination of a plurality of heating vessels or chambers arranged in a descending series, a discharge spout extending from each vessel except the last into the vessel below and having its discharge opening located in such lower vessel above the bottom thereof, and agitating devices for the material to cause the discharge thereof, whereby the quantity of material in each vessel except the first is automatically regulated, substantially as set forth.

3. The combination of a plurality of heating vessels or chambers arranged in a descending series, and an open-ended discharge spout depending from each vessel except the last into the vessel next below, said discharge spouts terminating above the bottoms of the vessels into which they depend, and stirrers for agitating the material in the vessels, whereby material is discharged from each vessel into that next below when material is withdrawn from the last vessel and all of the vessels are automatically kept partially filled, substantially as set forth.

4. The combination of a plurality of heating vessels or chambers arranged in a descending series, an open-ended discharge spout depending from each vessel except the last into the vessel next below, and agitating devices for causing the material to discharge through said spouts, said spouts terminating at substantially equal distances from the bottoms of the vessels into which they depend, whereby each vessel automatically discharges into that next below when material is withdrawn from the last vessel and a substantially constant quantity of material is automatically maintained in each of the vessels except the first, substantially as set forth.

5. The combination of a plurality of heating vessels arranged in a descending series, and an open-ended discharge spout which enlarges downwardly from its upper to its lower end depending from each vessel except the last into a lower vessel, said spouts terminating above the bottoms of the vessels into which they depend, whereby each vessel discharges the material into such lower vessel when material is withdrawn from the last vessel and the quantity of material in the vessels is automatically regulated, substantially as set forth.

6. The combination of a plurality of heating vessels or chambers arranged in a descending series, means for heating said vessels, means for withdrawing the material from the last vessel, a discharge spout leading from each vessel except the last into the vessel next below, and means for changing the elevation of the discharge opening of each discharge spout, whereby the quantity of material in each vessel except the first is automatically regulated, substantially as set forth.

7. The combination of a plurality of heating vessels or chambers arranged in a descending series, means for heating said vessels, means for withdrawing the material from the last vessel, and a discharge spout leading from each vessel except the last into the vessel next below, each discharge spout having a telescopic section, substantially as set forth.

8. The combination of a plurality of heating vessels or chambers arranged in a descending series in staggered order so that one vessel projects laterally beyond the next, a discharge spout depending from each vessel except the last into the vessel next below, and agitating devices for causing the material to discharge through said spouts, said spouts terminating above the bottoms of the vessels into which they depend, whereby each vessel discharges material into the vessel next below when material is withdrawn from the last vessel and the quantity of material in the vessels is automatically regulated, substantially as set forth.

9. The combination with a cooking apparatus, and a feed chute for the same, of a steam box located at the bottom of said feed chute and having a top over which the material passes provided with discharge perforations, a steam supply pipe for said steam box having an area greater than the combined area of said discharge perforations whereby steam pressure is maintained in said box, means for regulating the supply of steam to said steam box, and a steam gage located between said regulating means and said discharge perforations for indicating the steam pressure at that point to enable the proper adjustment of said regulating means to discharge a predetermined amount of steam into the material, substantially as set forth.

Witness my hand this 5 day of June, 1905.
ALFRED W. FRENCH.
Witnesses:
PAUL G. WEIDNER,
MARGIE M. WHITLOCK.